Patented June 23, 1953

2,642,847

UNITED STATES PATENT OFFICE 2,642,847

ELECTRIC CONTROL SYSTEM FOR HYDRAULIC STEP DRILLING MACHINES

Alden T. Roys, Worcester, Mass., assignor to Leland-Gifford Company, Worcester, Mass., a corporation of Massachusetts Application March 16, 1948, Serial No. 15,058

4 Claims. (Cl. 121—45)

This invention relates to a new and improved electric control system for a step by step drill operated by hydraulic power.

The principal object of the invention resides in the provision of effective, very fast operation for reciprocating the drill in step by step drilling, especially for the smallest size of drills; the provision of apparatus as disclosed in this invention which may be used to drill extremely long holes with a #70 drill, and the provision of a drilling machine having a control therefor for extremely fast and accurate control of the step mechanism, so that the smallest size drill will cut in extremely minute steps, so that the smallest of drills may be used with a minimum danger of breakage.

Another object of the invention resides in the provision of electrically controlled reciprocating apparatus for step by step drilling and the like, comprising a drill carriage, hydraulic power transmission means to traverse the carriage through rapid advance, slow feed, and fast return, in combination with a timer means arranged to control the hydraulic power transmission to throw the drill carriage into fast return, after a predetermined slow feed interval, all the foregoing being electrically rather than hydraulically or mechanically controlled, to operate the controls in extremely speedy manner, so that a #70 drill may drill through stainless steel in steps as small as a thousandth of an inch; and the provision of the above apparatus in combination with an extremely sensitive overload control.

Other objects and advantages of the invention will appear hereinafter.

Reference is to be had to the accompanying drawings in which.

Step by step drilling mechanisms are old in the art and have been found to work most satisfactorily in most cases by means of hydraulic power controlled hydraulically or by mechanical operation of control valves therefor. While these have been found to be generally satisfactory, they have not been found to be effective for the deep drilling of small holes, and this invention for the first time presents an electric control for a hydraulic power system for a step by step drill by means of which the smallest drills may be used to drill deep holes.

The character P indicates the pressure line from a pump of usual construction, this line entering the housing of the main pressure valve V-1 at the point shown. The housing contains a valve 1, spring pressed downwardly in the drawings by a spring 2 and adapted to be raised by a relay having a solenoid S-1. A drain W is connected to both ends of the valve housing V-1.

A line 3 leads from main pressure valve V-1 to a slow feed valve housing V-2 having a valve 4 spring pressed down by a spring 5 and adapted to be moved in the opposite direction by a relay having a solenoid S-2. Another line 6 leads from the housing V-1 to a pressure regulator valve housing V-3 having a valve 7 spring pressed in one direction by a spring 8 and movable oppositely by pressure in a line 9 connected through a bleeder valve 10. Numeral 11 indicates an adjustable bleeder valve for by-passing the slow feed valve V-2. Line 12 is tied into line 3 and a line 13 leading directly to the bottom of the power cylinder M for piston O which directly mounts the drill head.

A line 14 leads from the top of cylinder M to the pressure regulator valve V-3 and this line communicates with an overload control Q having a piston 15 adapted to actuate a switch J to be later described. The overload control piston is reset by pressure from line 9 in conjunction with a spring 16.

L1, L2 indicate leads for the tieing in to the usual 110 volt 60 cycles current. L1 leads to a branch 20 connected to a timer T and continues to a triple branch 21, 22, 23. Branch 21 continues to a double pole switch having contacts 24, 25; and to a single contact 26. The contact 25 leads to a stop push button B and a start push button A in branch 22, the latter being connected at 27 to a line 28 controlling a relay having solenoid C-1 operating the switch for contacts 24, 25, 26. Line 28 continues through C-1 through a stop switch C to a normally closed switch D and through a line 29 to one side of the switch J. From D line 28 continues through a line 30 to L2.

The timer T is operated by a relay having a solenoid C-2 connected to L2 and a switch G through line 31. Switch G is secured in predetermined position to the frame of the machine and is closed only by contact with a slip cam block SCB in a yoke Y secured to the piston O or the drill head. When switch G is closed the contact is made through a normally closed manual switch H back to L1 by a line 32. Solenoid C-2 thus closes contact 33 and starts the timer T.

The timer being thus energized, closes a contact 34 connected to L2, after a predetermined but adjustable time interval so as to operate a relay having a solenoid C-3, thus opening a contact 35 and closing a contact 36. The other side of the solenoid C-3 is connected through line 23 to L1. Contact 36 being closed operates through line 37 to a normally closed switch E, through line 38 therefrom, through line 30 to L2, thus keeping contact 35 open although contact 34 opens which happens immediately the slip cam block SCB retracts from switch G.

When contact 26 is closed the solenoid S-1 is energized through line 21 and line 39, line 40, through normally closed contact 35, to L2, and pulls up the valve 1. When contact 35 is opened, the solenoid S-1 is deenergized.

The slip cam block also throws a single pole double throw switch F to close the latter and energize solenoid S-2 through lines 41, and 40, through contact 35 to L2. When contact 35 is open, solenoid S-2 is deenergized. The solenoid C-3 is deenergized by opening normally closed switch E. This action is accomplished by the yoke Y at its top position.

Normally closed switch D is opened by adjustable cam block K to deenergize solenoid C-1 causing contacts 25 and 26 to open and contact 24 to close. Opening contact 26 causes both solenoids S-1 and S-2 to become deenergized, and closing contact 24 energizes solenoid S-3 through line 42 to swing out catch N to contact and stop the slip cam block SCB as the yoke rises.

Switches C and Cx are connected mechanically, and on being open they deenergize solenoid C-1 and also prevent S-3 from being energized. Switch H on being opened prevents solenoid C-2 from being energized when switch G is closed by the slip cam block.

The sliding yoke or frame Y is fixed to the drill carriage and, therefore, reciprocates with the piston O. The sliding cam block SCB moves with the yoke but is not fixed thereto being frictionally secured by means of spring-loaded brakeshoes conventionally indicated in Fig. 1 at 50, 50, and the spring being indicated at 52, so that the sliding cam block will retain its vertical position wherever it is placed. As will be understood, the slip cam block will reciprocate with the yoke and as the latter keeps continuously feeding downwardly in the manner of the step by step drill feed the block SCB will move with the yoke, except that if the latter strikes an obstruction it will be relatively moved upwardly in the yoke and thus at each drill step it will rise relatively to the yoke.

Figure 1:
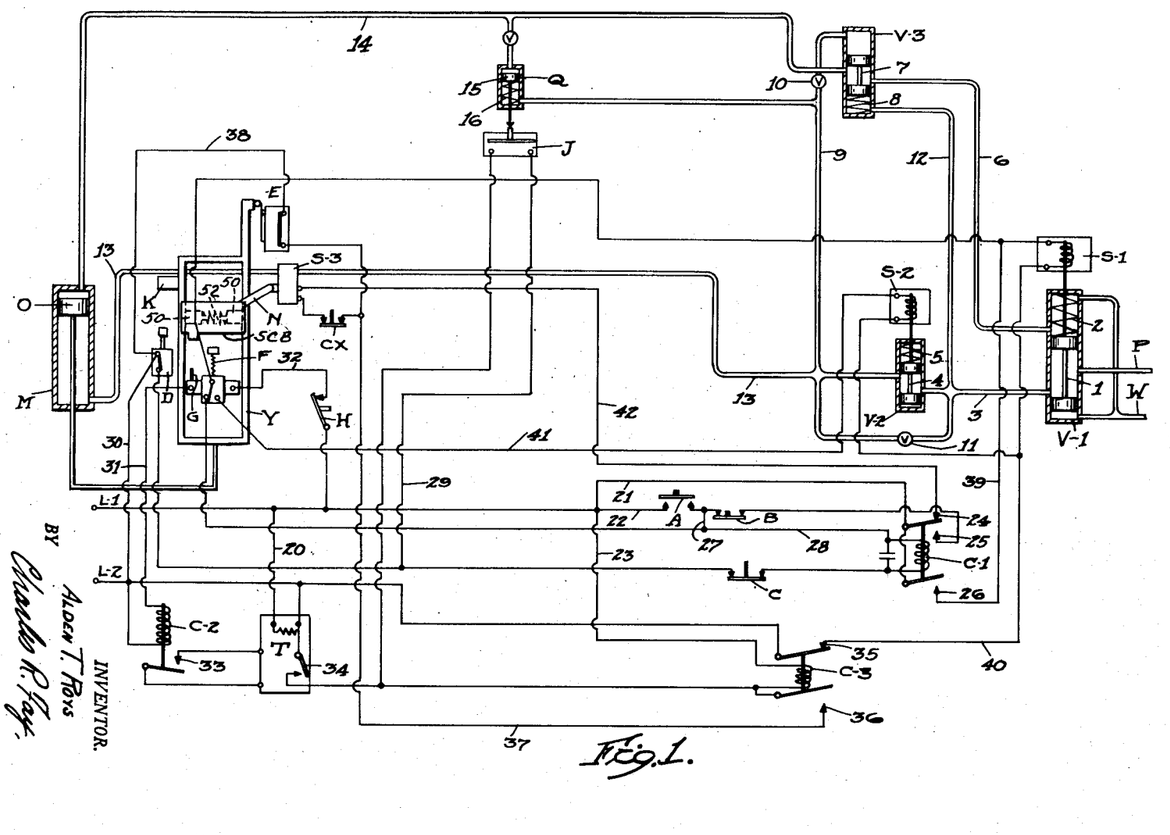
Fig. 1 is a diagrammatical representation of the invention showing the parts at rest.

With the mechanism at rest as in Fig. 1, pressure is admitted to the main solenoid operated control valve V-1 which directs oil through line 3 to the solenoid operated slow feed valve V-2 and thence to the bottom port of the cylinder M, thus forcing the piston O to the top of the cylinder. The piston of course takes with it the yoke, drill, and block SCB.

Figure 2:
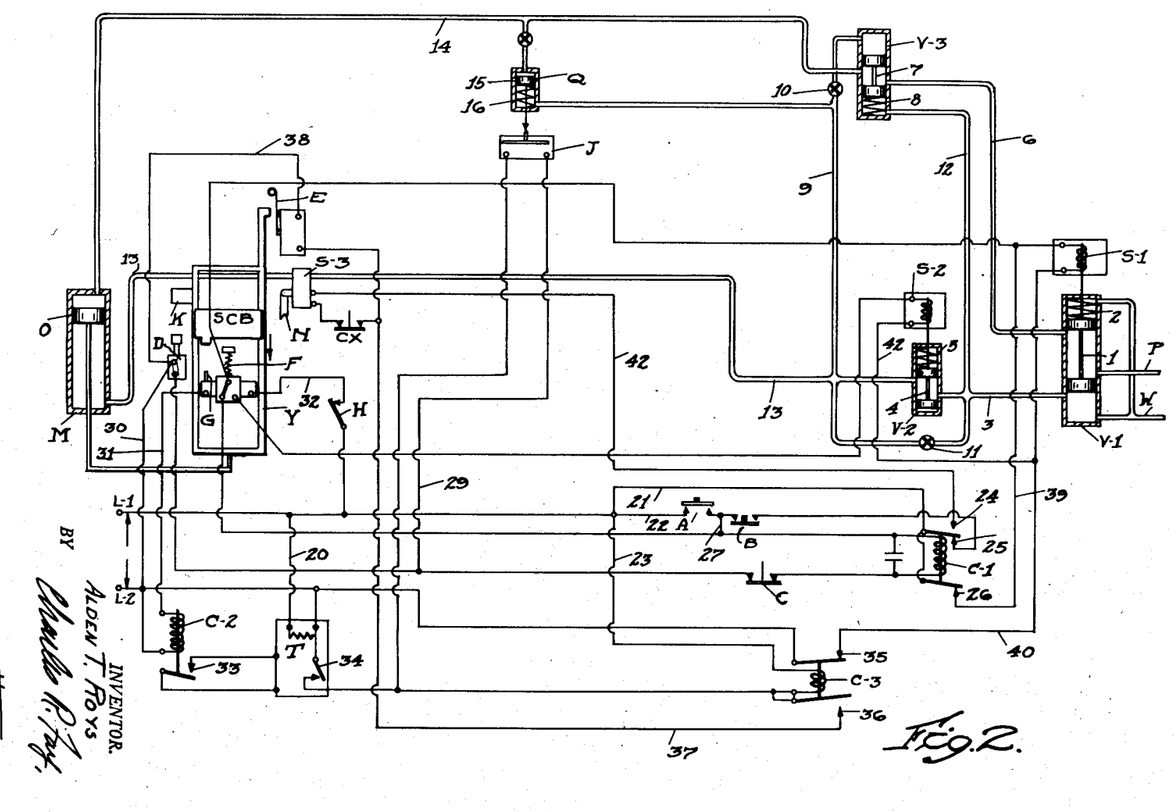
Fig. 2 is a diagrammatical representation showing the parts during fast traverse downwards.

The starting switch A when closed energizes relay coil solenoid C-1, which then closes the contacts 25 and 26 and opens contact 24, which is normally closed. The closing of contact 25 provides a second circuit to keep the solenoid C-1 energized after the operator's finger is removed from the starting switch A and the same opens. The closing of contact 26 energizes solenoid S-1, which pulls up the main control valve V-1, so that pressure is admitted through the pressure regulator valve V-3 to the top port of cylinder M through the line 14. The bottom port of cylinder M is now open to the drain, see Fig. 2. By this means the piston O is, of course, moved downwardly at a fast traverse rate and the parts of the circuit will all be as shown in Fig. 2.

Figure 3:
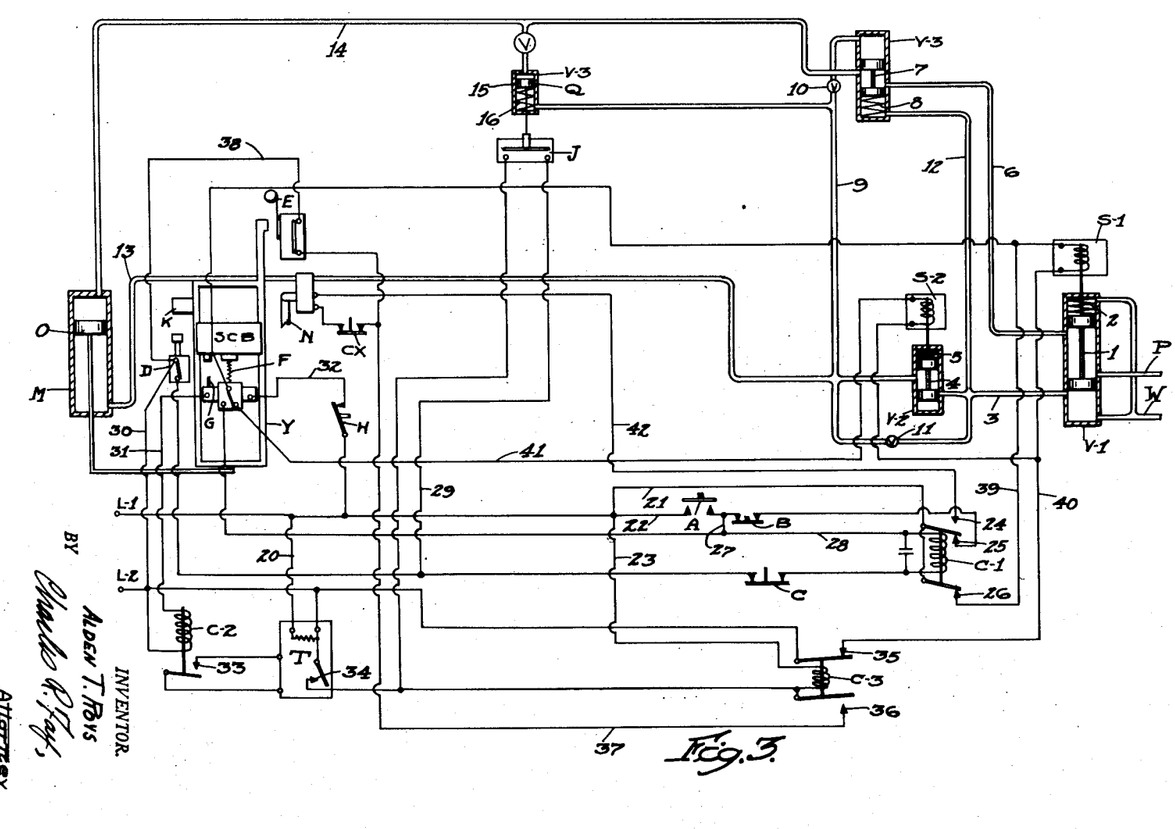
Fig. 3 is a diagrammatical representation of the apparatus showing the slow feed condition.

The yoke Y descends with piston O and slip cam block SCB descends with the yoke. When the piston and the yoke have traveled a predetermined distance, slip cam block SCB strikes switch F and closes line 41 energizing solenoid S-2, which closes the slow feed valve V-2. By this means all the oil discharging from the bottom port of cylinder M has to pass through adjustable bleeder valve 11 in order to drain, because valve V-2 is now closed off, see Fig. 3. Therefore, the rate of travel of the piston and the drill carriage is controlled by the drain and the slow feed rate starts with the parts as shown in Fig. 3, the switch F being represented as closed.

Figure 4:
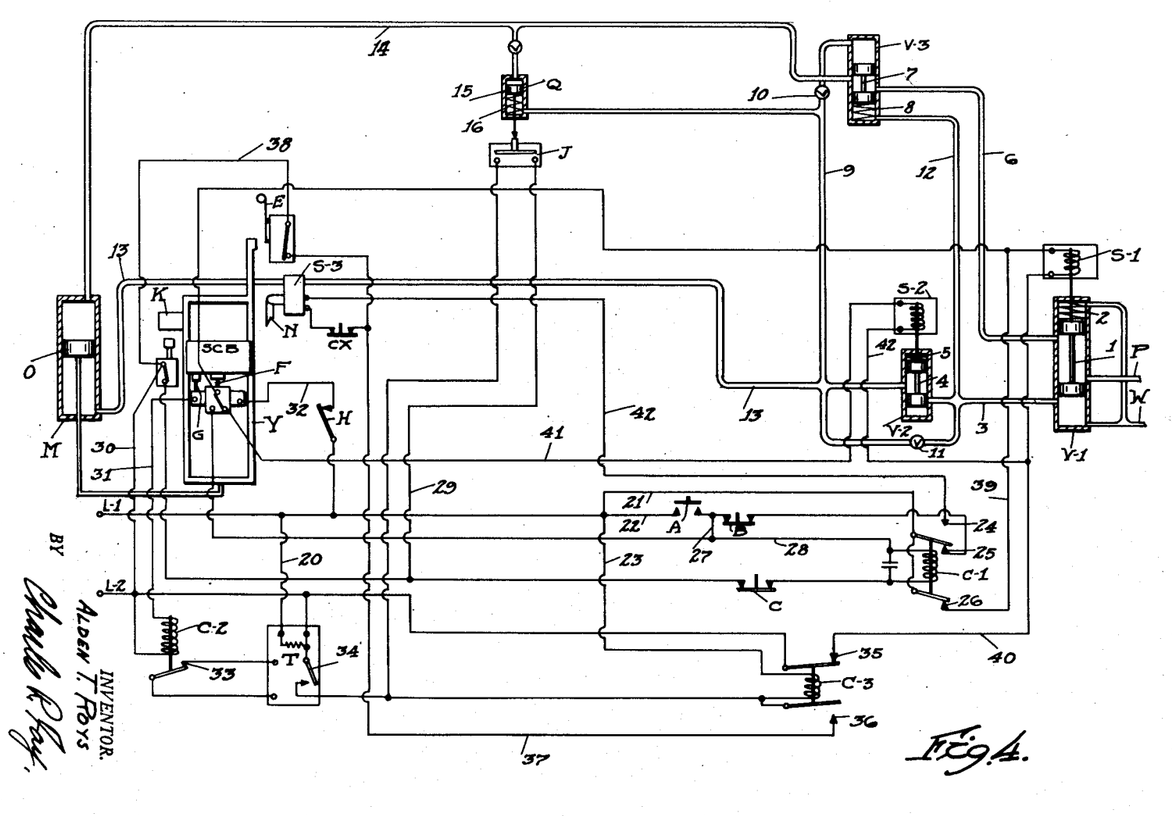
Fig. 4 is a diagrammatical representation of the invention showing the parts at the instant the drill contacts the work.

Electric switch G is positioned so as to be operated by the slip cam block at the instant the drill point comes in contact with the work. This switch is then closed by the slip cam block and energizes a relay C-2 which closes a switch 33. By closing switch 33 the timer T is thrown into operation and the purpose of this timer is to close switch 34 after a predetermined length of time. The timer T is conventional and well known and need not be further described. By closing the switch 34 a coil C-3 is energized causing a contact 35 to open and one at 36 to close.

The opening of the switch 35 deenergizes both solenoids S-1 and S-2, it being noted that switch 35 is normally closed. By this means the main pressure valve V-1 is moved by its spring to again admit pressure to the bottom port of the cylinder M and to open the top port thereof to drain through the pressure regulator valve V-3. The spring of valve V-2 causes it to be moved so that pressure is admitted to the bottom port and piston O is traveled upwardly to top position at fast traverse rate, see Fig. 5.

Figure 5:
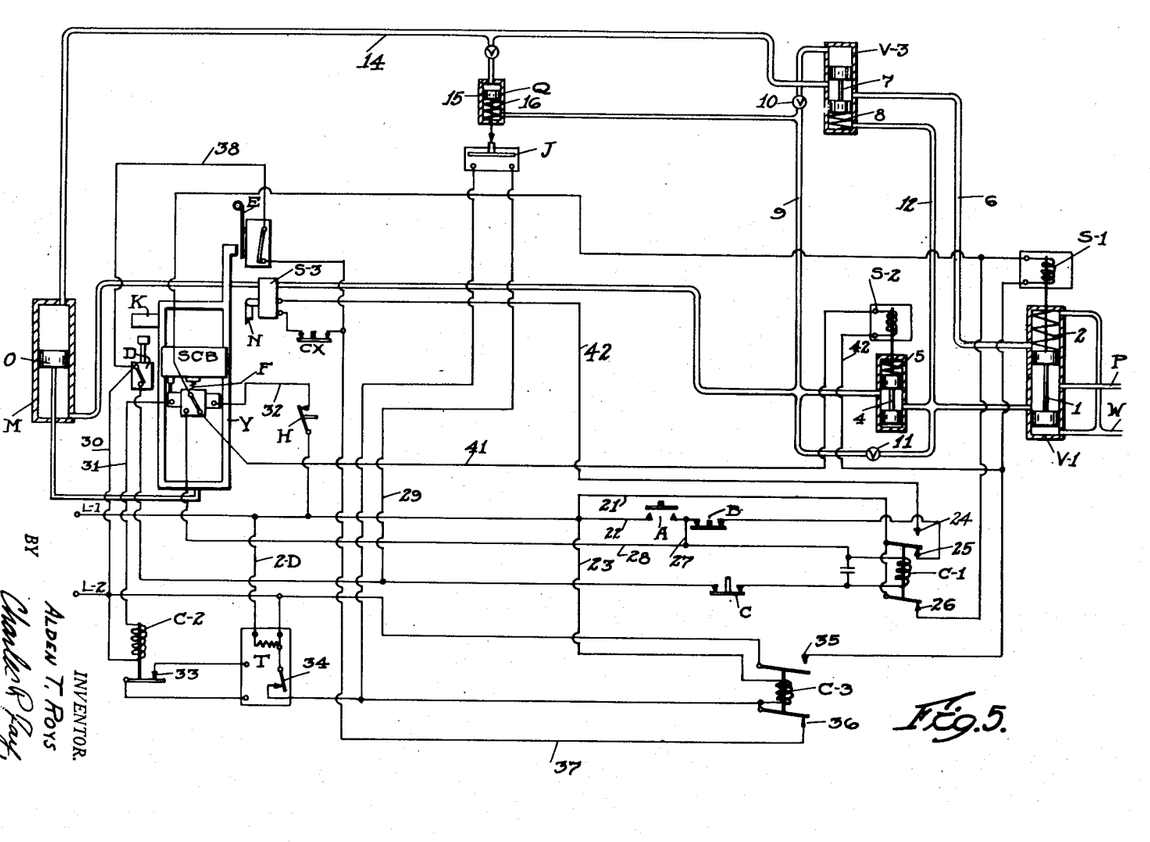
Fig. 5 is a diagrammatical representation illustrating the position of the parts when the timer operates.
Figure 6:
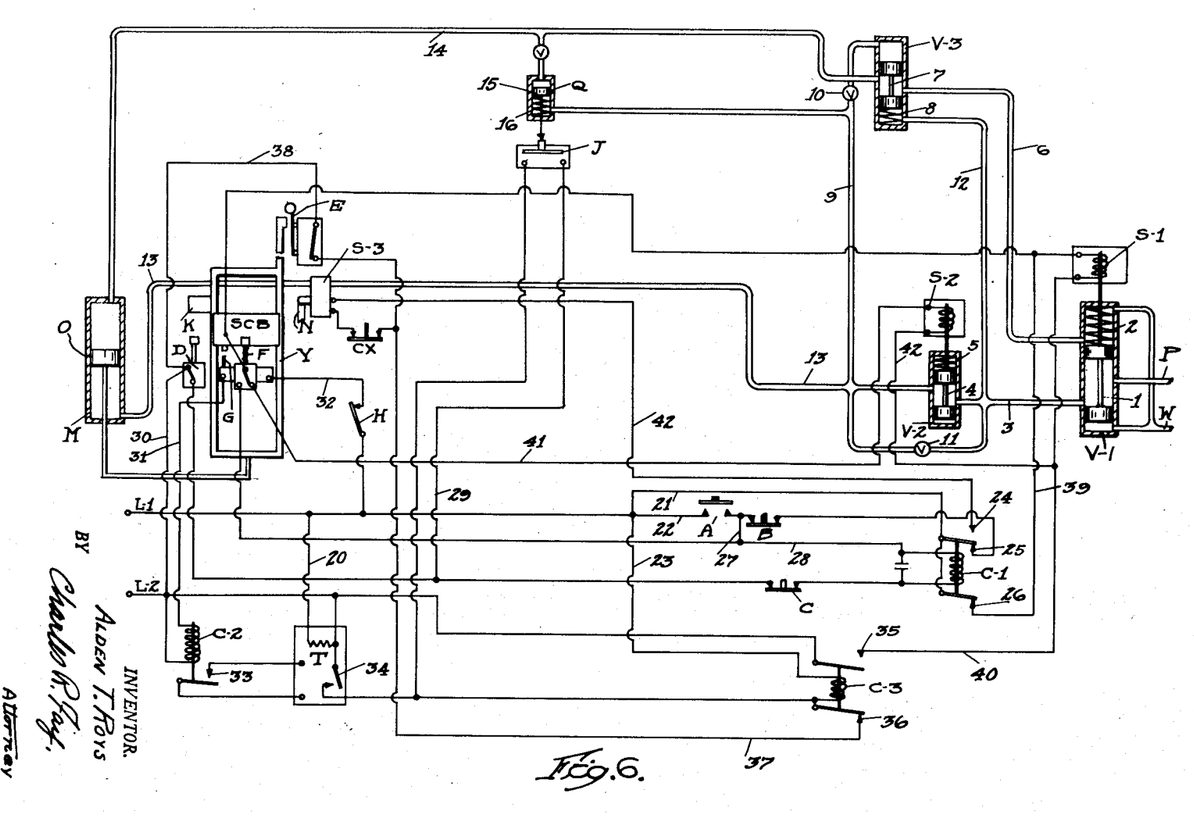
Fig. 6 is a diagrammatical representation of the parts showing the same in condition for fast return traverse.

The closing of switch 36 provides a second circuit to keep the relay coil C-3 energized after switch G is released by the slip cam block in the upward movement of the yoke. Contacts 33 and 34 have also reopened since switch G is now open and this happens the instant the piston starts to travel back toward its top position.

When the yoke reaches its top position it strikes and opens a normally closed switch E. By opening switch E the relay coil C-3 is deenergized and switch 35 closes and switch 36 opens. The closing of switch 35 reenergizes solenoid S-1 and the cycle repeats as above described.

It is to be understood, however, that as the slip cam block strikes the switch G which is of the block type, the yoke nevertheless proceeds downwardly until the switch 34 is closed, but the slip cam block cannot proceed downwardly as it is held back by the block switch G.

Therefore, the next descent of the yoke is greater in distance by exactly the amount of relative displacement of the slip cam block in the yoke. Thus the drill descends in rapid traverse the entire length of the already drilled hole, plus the length of reciprocation of the drill from the top of its stroke to the workpiece. Also, each step by step drilling cycle is exactly the same except for the fact that the yoke descends farther and farther each step along with the drill carriage and the piston, but the slip cam block remains in its same position, i. e., it can go no further downwards than as limited by the block switch G.

Now, however, after the predetermined depth of cut has been achieved, the normally closed switch D is contacted by the adjustable block K on the yoke. This opens the switch D and by this means the relay coil C-1 is deenergized causing the contacts 25 and 26 to open and contact 24 closes. The opening of the contact 26 deenergizes both solenoids S-1 and S-2, so that the springs therein take effect and cause piston O to travel to its starting top point at fast traverse rate.

Figure 9:
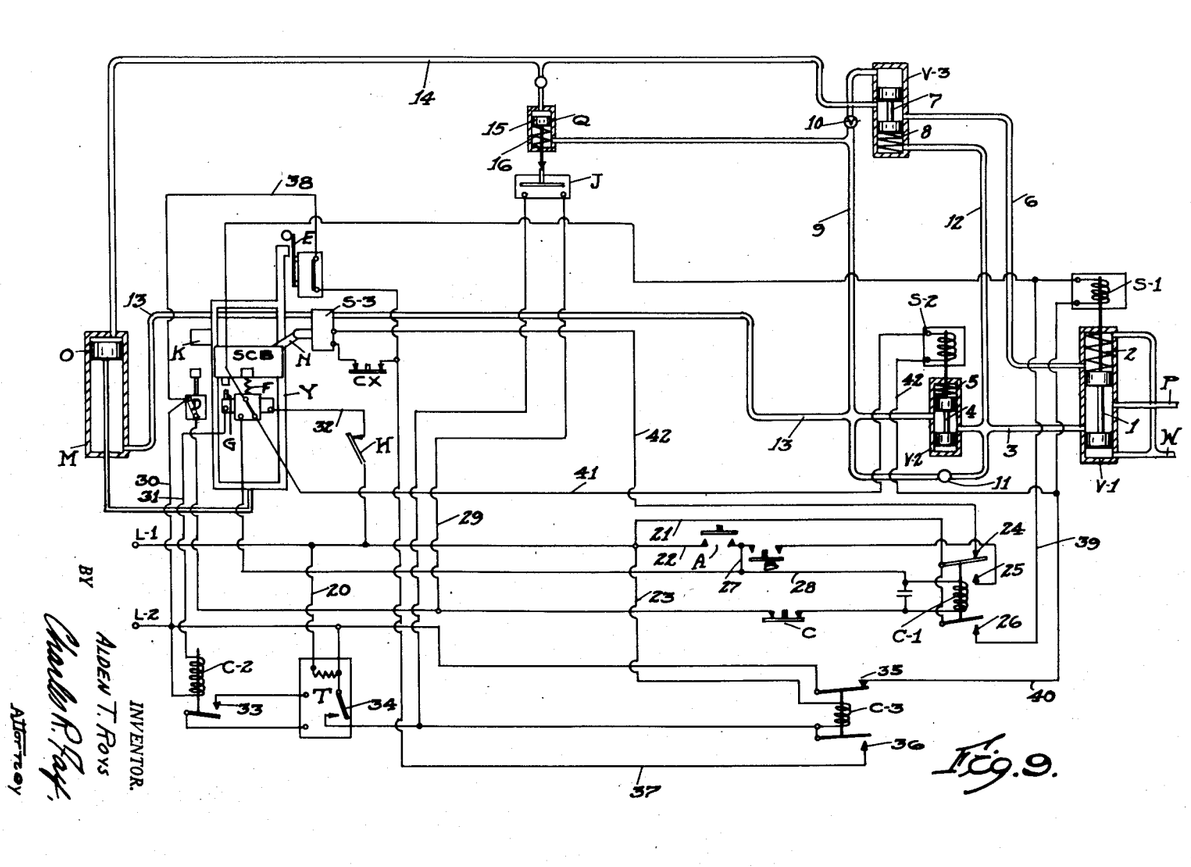
Fig. 9 is a diagrammatical representation showing the parts during stop and reset.

The closing of the switch 24 causes a solenoid S-3 to become energized. This solenoid raises a latch N into the position shown in Figs. 1 and 9, so as to be engaged by the slip cam block as it rises with the yoke, thus holding the block down, the yoke continuing to rise but the block remaining as held by the latch.

As the yoke reaches its topmost position, it opens normally closed switch E, deenergizing solenoid S-3 and releasing the latch. Since switch D has previously deenergized relay coil C-1, the mechanism remains at rest with parts as shown in Fig. 1, and the cycle is completed.

If the operator for any reason wishes to stop the mechanism at any time during the cycle, the normally closed switch B is held open until the slip cam block operates switch F. By this action the normally closed contact of switch F is opened and when these two switches are open at the same time, the relay coil C-1 is deenergized and the same sequence of events occurs as was above described, i. e., the yoke rises to the top or starting position and stops. The reason for requiring both switches to be open before the mechanism returns to its starting position is to always have the slip cam block in position, so that the latch N will always be able to return the slip cam block to its initial position when the mechanism is stopped by means of switch B.

Figure 10:
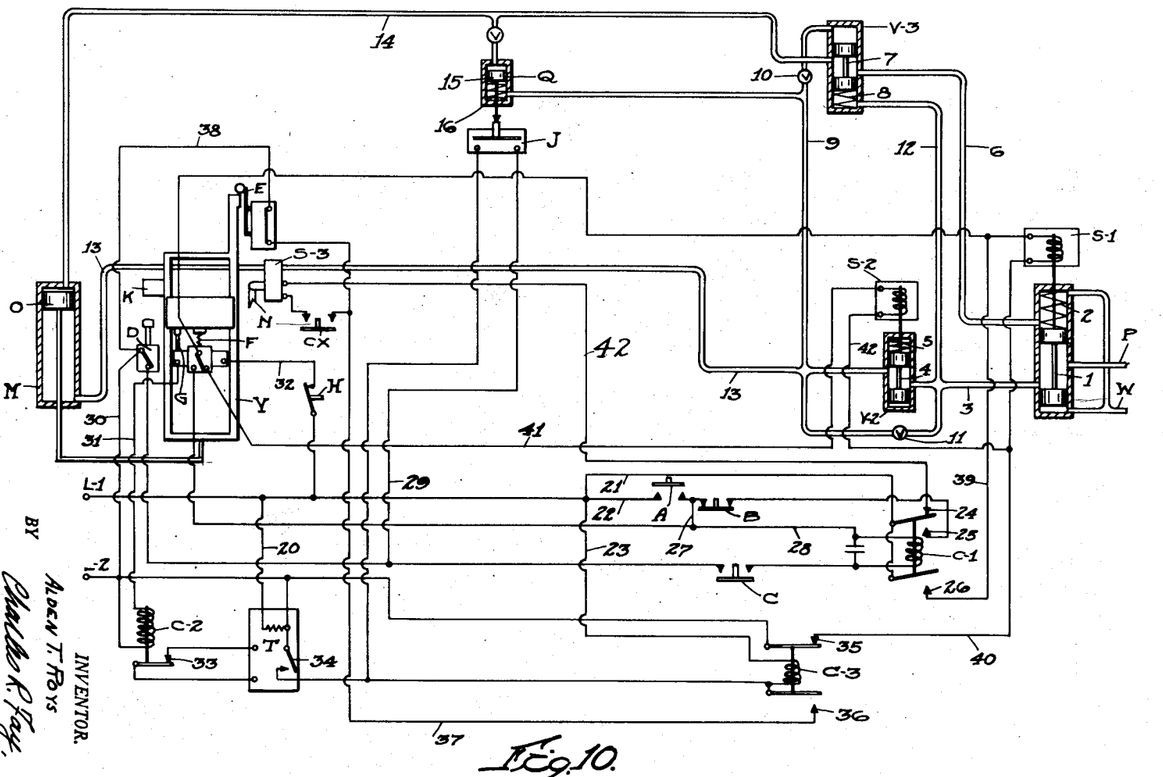
Fig. 10 is a diagrammatical representation showing the parts in stop position without reset.

However, it may be desired to stop the mechanism at any time during its cycle and not have the slip cam block return to its initial or zero position, so that when the mechanism is again actuated, it will take up where it left off in a hole, for instance, one that is already half or part way drilled. In order to do this, the two normally closed switches marked C and CX are opened. These two switches are linked together mechanically, so that they can both be opened by operating a single button. By opening these two switches the relay coil C-1 is deenergized and, at the same time, solenoid S-3 is prevented from being energized because of the opening of switch CX so that the latch N is not operated and the yoke returns to the starting position, with the slip cam block at whatever position it was in when the two switches were opened. Therefore, at the next start the drill will go down to the point it left off and finish its original cycle.

If it is desired to operate the mechanism with a plain feed which is not step by step, hand operated switch H is opened and this prevents the relay coil C-2 from being energized when switch G is closed by the slip cam block. This prevents the timer T from operating, which allows the piston and yoke to feed at slow traverse until stopped by one of switches C, CX, D, or B.

Figure 7:
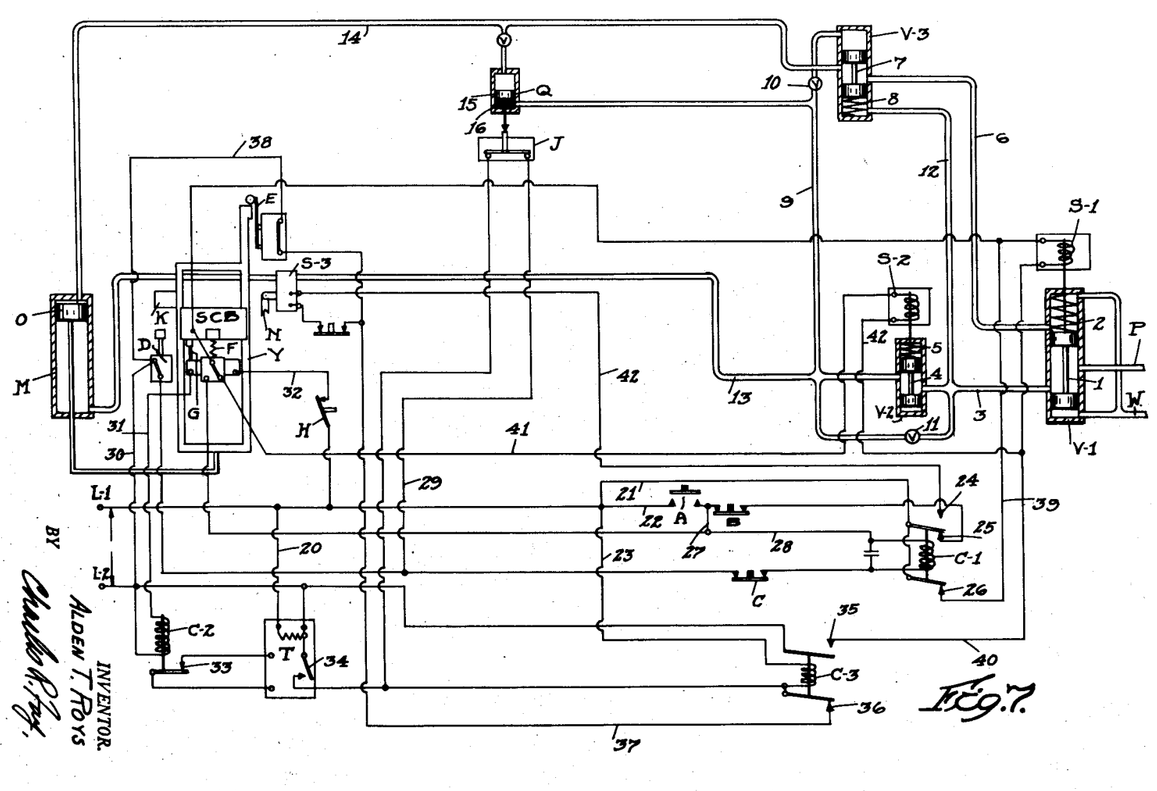
Fig. 7 is a diagrammatical representation showing the parts in overload reverse condition.
Figure 8:
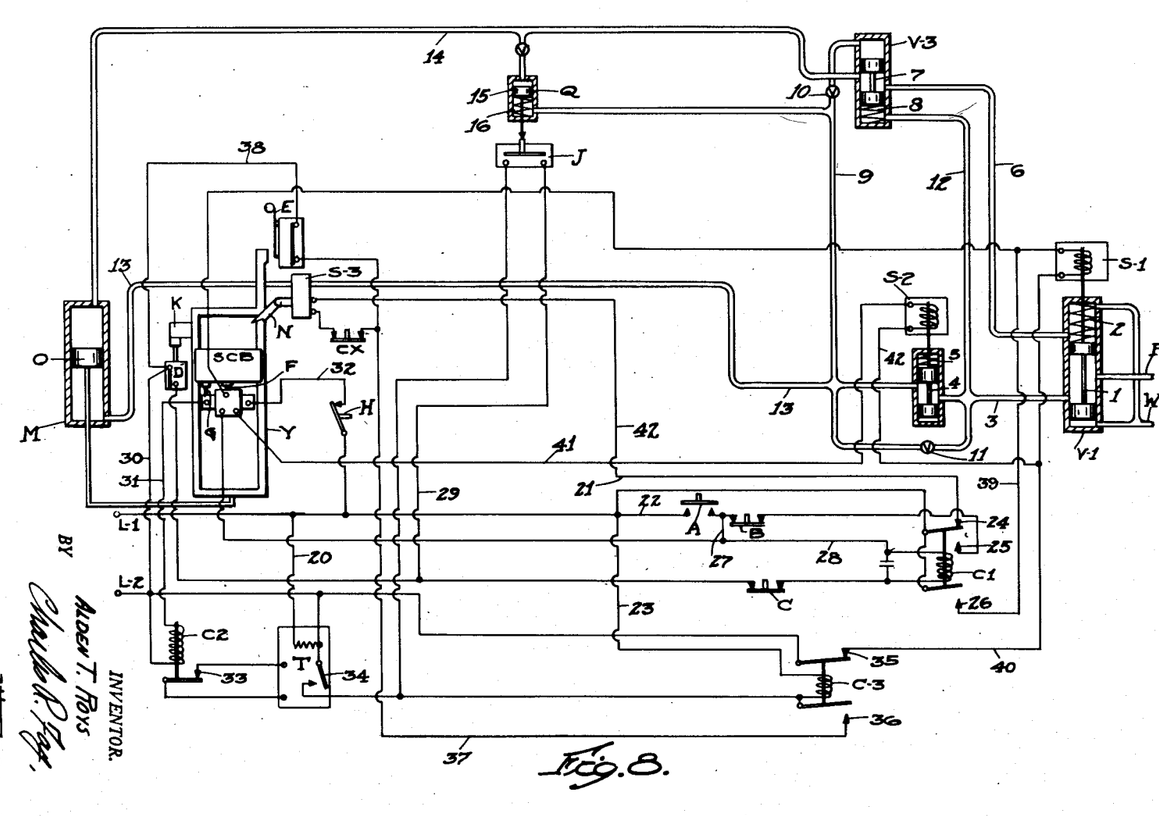
Fig. 8 is a diagrammatical representation showing the parts at final stop for resetting at the end of the cycle.

If the top pressure in the cylinder for any reason builds up to an excessive value, switch J is operated by the overload control Q by reason of the back pressure in pipe 14 overcoming the resistance of spring 16. This energizes relay coil C-3 which initiates the same sequence of events as the closing of contact 34 described above. In other words, the overload control causes the drill to reverse and dive repeatedly until the excessive resistance is removed, which may be due to a dull drill or chips in the bottom of the hole. Then the cycle is completed to the full desired depth.

Having thus described my invention and the advantages thereof, I do not wish to be limited to the details herein disclosed otherwise than as set forth in the claims, but what I claim is:

1. High speed electrically operated valve actuating means for a step by step drilling machine or the like including a hydraulic cylinder and piston, a main valve and a slow feed valve, a member secured to the piston and a slip block on the member, comprising a pair of electric contacts in the path of the slip block and adapted to be actuated seriatim thereby, electrical means to reverse the valves, the first contact to be actuated by the block energizing the electric means for the slow feed valve to cause the piston to travel at slow feed, a timing device, a relay, a pair of contacts for operation by the relay, one contact being closed and the other open, the second of the first pair of contacts energizing the timer upon actuation by the slip block and the timer after its predetermined period energizing the relay to actuate the second pair of contacts, the one of which being opened deenergizes the electrical means for the valves, and the one of which being closed maintains the relay energized, whereby the piston moves into fast return, a fifth contact actuated by the member as the latter reaches its uppermost position to open the relay circuit to reverse the positions of the second pair of contacts, whereby the electric valve reversing means is again energized and the cycle repeats.

2. The apparatus of claim 1 including a sixth contact adapted for actuation by the member as the latter reaches a predetermined final downward position, a relay controlled by the sixth contact, contacts controlled by the relay to open the circuits to deenergize the electric means to reverse the valves to raise the piston, the first named relay circuit now being of no effect to reenergize the electric means, whereby the system comes to rest.

3. The apparatus of claim 1 including means to bring the piston and member to the top of the reciprocal travel thereof and stop the step cycle, said means including a contact, a relay in circuit therewith, and a latch operated by the last relay to be positioned in the path of the block to hold the same down as the member rises to final rest position.

4. Electrically controlled feed apparatus for step by step drilling or the like, comprising a hydraulic power system, a main valve and a slow feed valve therefor, and a cylinder and piston, comprising a solenoid for each valve, electric contacts for controlling the operation of the solenoids, an overload contact, a plunger to operate said overload contact, hydraulic means operating the plunger and connected to the cylinder at the pressure side of the piston, said overload contact deenergizing the solenoids when actuated by the plunger, and means resisting operation of the plunger, a relay energized by the overload contact, a pair of contacts reversed thereby, one of the pair of contacts upon opening, deenergizing the solenoids and the other of the pair of contacts upon closing, maintaining the relay energized, and another contact at the top of the travel of the piston for opening the relay circuit to repeat the cycle by reversing the pair of contacts.

ALDEN T. ROYS.

References Cited in the file of this patent

UNITED STATES PATENTS

| Number | Name | Date |
|---|---|---|
| 1,496,953 | Stewart | June 10, 1924 |
| 1,911,132 | Macomber | May 23, 1933 |
| 1,911,138 | Clute et al. | May 23, 1933 |
| 2,051,052 | Morgan | Aug. 18, 1936 |
| 2,245,080 | Pendleton | June 10, 1941 |
| 2,287,559 | Nye | June 23, 1942 |
| 2,310,124 | Shartle | Feb. 2, 1943 |
| 2,324,727 | Shartle | July 20, 1943 |
| 2,375,946 | Reichelt | May 15, 1945 |